United States Patent [19]
Pye

[11] Patent Number: 5,220,310
[45] Date of Patent: Jun. 15, 1993

[54] LIQUID LEVEL DETECTOR WHICH OVERCOMES HYSTERISIS IN THE DETECTOR ELEMENT

[76] Inventor: Earl L. Pye, 12599 Gentle Breeze Way, Victorville, Calif. 92392

[21] Appl. No.: 684,841

[22] Filed: Apr. 15, 1991

[51] Int. Cl.$^5$ ............................................. G08B 21/00
[52] U.S. Cl. .................................. 340/624; 340/618; 73/308
[58] Field of Search ............... 340/623, 624, 625, 618; 73/313, 308; 137/551, 558

[56] References Cited

U.S. PATENT DOCUMENTS

| | | | |
|---|---|---|---|
| 4,625,284 | 11/1986 | Suzuki | 73/313 X |
| 4,771,804 | 9/1988 | Morales | 73/313 X |
| 4,821,022 | 4/1989 | Jannotta | 340/624 X |

*Primary Examiner*—Jin F. Ng
*Assistant Examiner*—Jeffery A. Hofsass
*Attorney, Agent, or Firm*—Boniard I. Brown

[57] ABSTRACT

A liquid level detector in which a float is operatively connected to the core of a linear variable displacement transformer. Output signals from the transformer are amplified, sampled, and averaged to obtain an indication of changes in liquid level. As an important feature of the invention, a cyclic disturbance mechanism is oriented to jostle or disturb the float or a motion-transmitting member connected to the float. The jostling force frees the float from frictional forces that would otherwise tend to prevent the float from reaching a true equilibrium position relative to the liquid surface. The float tends to continuously cycle back and forth, hunting a true equilibrium position. By sampling the float position a large number of times, such as one hundred times, an averaged signal representing the true equilibrium position of the float is obtained.

15 Claims, 2 Drawing Sheets

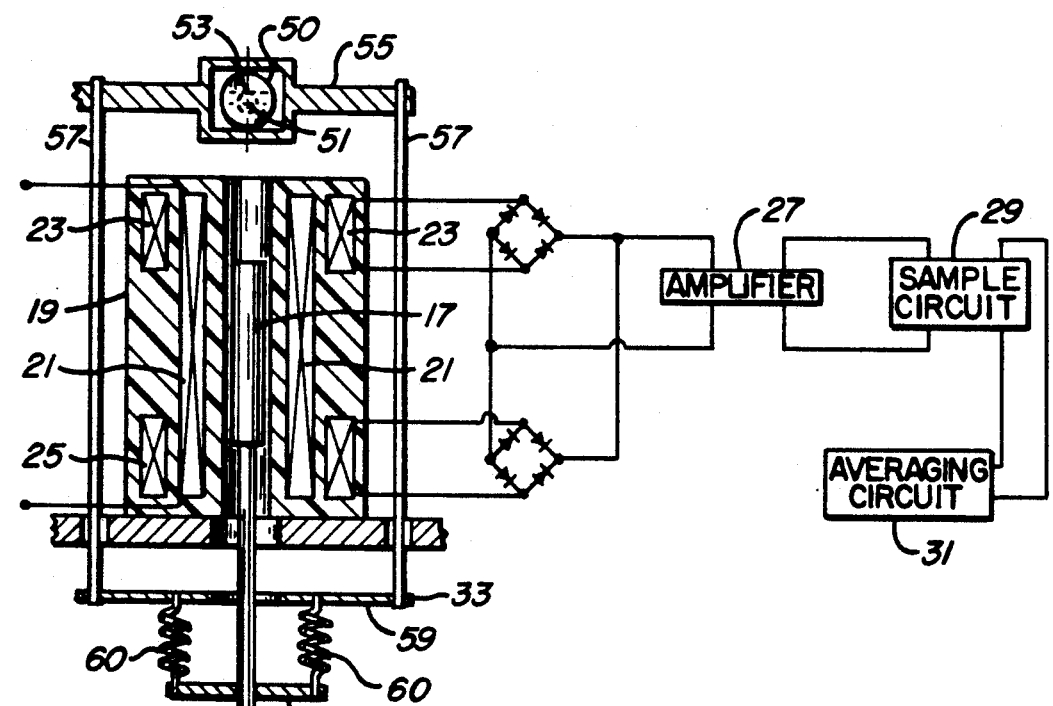
FIG.—1

LIQUID LEVEL DETECTOR WHICH OVERCOMES HYSTERISIS IN THE DETECTOR ELEMENT

BACKGROUND AND SUMMARY OF THE INVENTION

The present invention relates to a mechanism for cancelling the effects of frictional stress on position detector elements. The invention is particularly useful in liquid level detectors.

In one type of liquid level detector, a float rides on the liquid surface, and a rod or arm structure extends from the float to operatively connect with a readout mechanism—e.g., the slider of a potentiometer or the needle on a gage. Frictional resistances in the system tend to prevent the float from reaching a true equilibrium position relative to the liquid level surface. Eventually, the frictional resistances are overcome, whereupon the float moves toward and often beyond the true equilibrium position. At times the float may be slightly higher than a true equilibrium position, and at times the float may be slightly lower than the true equilibrium position.

The present invention utilizes a disturbance mechanism for periodically jostling the float or an associated motion member, whereby frictional stresses or motion-retarding stresses are overcome. A cyclically-excitable electric sensing means, typically a linear variable displacement transformer, is used as a readout device, whereby the float position is repetitively sensed at spaced time intervals—e.g., ten thousand sensor signals per second. A sampling circuit and an averaging circuit are used in conjunction with the electric sensing means so that the equilibrium position of the float is established by averaging a large multiplicity of output signals generated by the electric sensing means. With the contemplated arrangement, individual signals may be higher or lower than a true equilibrium signal, but the signal average will be representative of the true equilibrium float position, within a comparatively small inaccuracy range.

The disturbance mechanism utilized to jostle the float, or its motion member, may be designed to have only intermittent engagement with the float mechanism, whereby the float is free-floating on the liquid surface during the major portion of each disturbance cycle. The float is then under the control of the disturbance mechanism for only a minor portion of each disturbance cycle. In a typical situation, the disturbance mechanism might be arranged to strike or jostle a float motion member once each second. During each one second period the disturbance mechanism might be in contact with the float motion member less than 100 milliseconds. The aim is to impart a disturbing force to the float motion member to enable the float mechanism to overcome frictional stresses, while at the same time permitting the float motion member to be essentially unrestrained by the disturbance mechanism during the major part of each disturbance cycle.

This invention may be utilized for the detection of leaks in liquid-containment tanks by sensing slight changes in liquid level. The invention has potential application in any detection system wherein the detector element has difficulty in reaching an equilibrium condition due to hysteresis effects.

BRIEF DESCRIPTION OF THE DRAWINGS

FIG. 1 illustrates features of a liquid level detector mechanism embodying features of the invention;

DESCRIPTION OF A PREFERRED EMBODIMENT OF THE INVENTION

Figure 4:
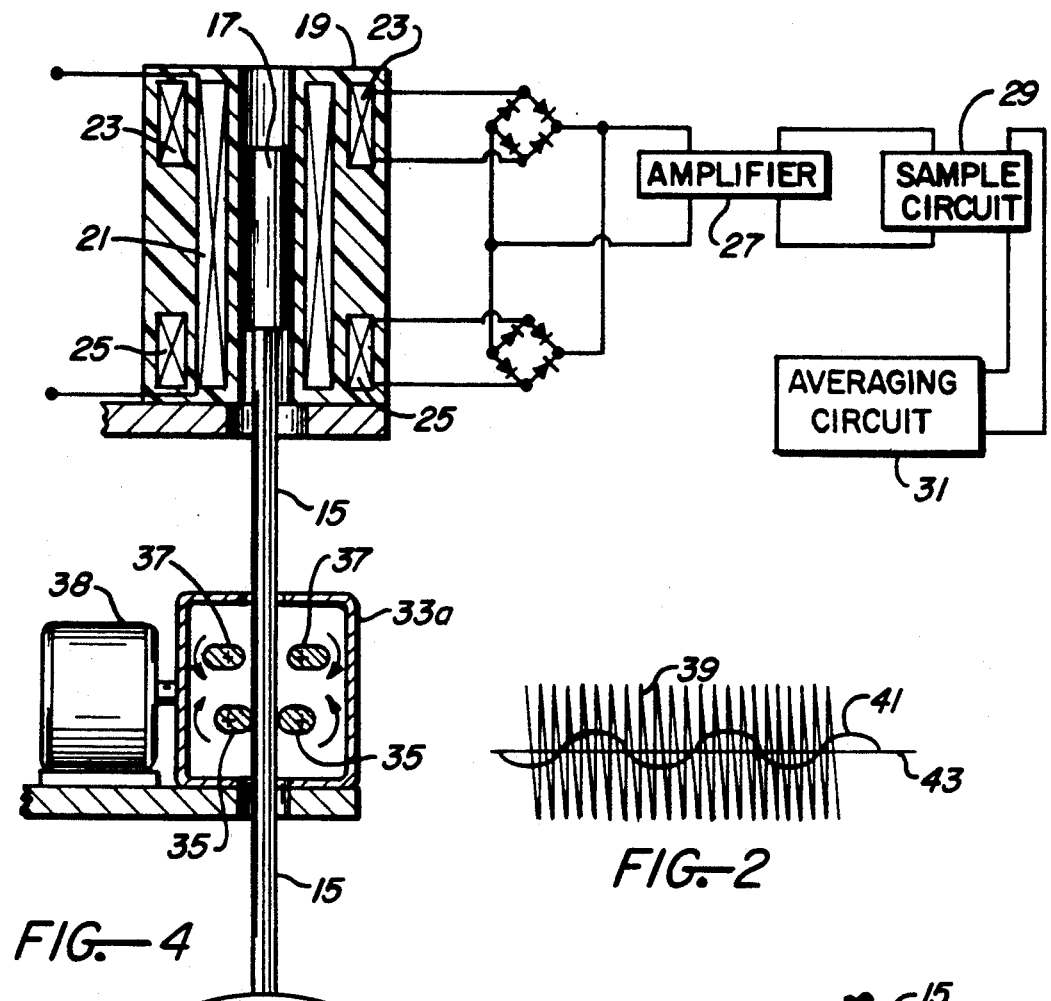
FIG. 4 is a view similar to that of FIG. 1, illustrating another embodiment of the invention.

Referring to FIG. 1 of the drawings, a liquid level detector mechanism is shown as including a float 11 adapted to ride on the surface of a liquid body 13, and a motion-transmitting rod member 15 extending upwardly from the float to connect with a cylindrical steel armature core 17 disposed within an electric sensing means 19.

Sensing means 19 is illustrated as a linear variable displacement transformer having a primary winding 21 and axially-spaced secondary windings 23 and 25. The transformer may be a commercially-available device such as is obtainable from TransTek Incorporated of Ellington, Conn., under its designation "Model 270". Other companies manufacture linear variable differential transformers which may be utilized in the practice of the invention.

When the primary winding of the transformer is excited by an external A.C. source at a relatively high excitation rate, such as 10,000 cycles per second for example, magnetic flux is generated within core 17. Voltages are generated in secondary windings 23 and 25 in accordance with the position of the core along the core axis. The secondary windings are connected in series opposition, producing an essentially zero output voltage when the core is at the electrical center of the transformer system, as shown in FIG. 1. The output voltage increases linearly when core 17 is displaced vertically in either direction, up or down.

In the illustrated arrangement, the linear variable displacement transformer translates small changes in the position of float 11 into voltage signals in the output leads for secondary windings 23 and 25. The voltage signals are applied to an amplifier 27 connected to a sample circuit 29. The sample circuit detects the voltage values at time-spaced increments, and forwards the detected values to an averaging circuit 31, which produces a signal average output which may be one data point on a computer plot of the liquid level condition. A graph of the various data points indicates any change in the liquid level over the corresponding time period in which the voltage signals are being sampled.

The electrical system including sample circuit 29 and averaging circuit 31, can be utilized as an accurate leak detector for a tank containing liquid body 13. An alarm system may be connected to the output signal derived from averaging circuit 31, to generate an alarm signal in response to predetermined leakage rates or leakage quantities.

A principal feature of the present invention is a disturbance mechanism 33 arranged to cyclically disturb motion member 15, whereby frictional stress or hysteresis in the system is eliminated as an error factor. Various types of mechanical or acoustical devices may be employed to exert disturbance forces on motion rod member 15.

FIG. 1 shows a disturbance mechanism which includes a motor-driven cam 50 rotatable about an axis 51 eccentric to the cam axis 53. As the cam rotates about axis 51, it applies a vertical reciprocatory force to a frame 55, which includes two vertical rods 57 attached to a lower disk 59. Tension springs 60 are trained between disk 59 and a second disk 61 carried by motion member 15.

Float 11 is essentially free-floating even though it is effectively attached to springs 60. The float is subjected to three forces: the weight of the float, the float buoyancy force of the liquid, and the spring force. The float responds to these forces by seeking an equilibrium position. The equilibrium position will not be the same position as the float would assume in the absence of the jostling mechanism. However, the float position will be a liquid level-seeking position which overcomes or eliminates the effect of frictional hysteresis factors in the system.

Figure 2:
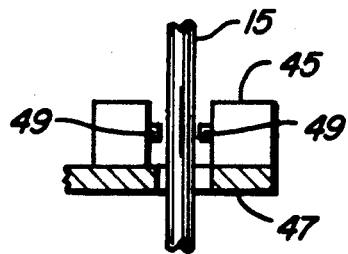
FIG. 2 is a graph illustrating comparative cycle rates obtainable with the mechanism of FIG. 1.

The magnitude of the frame 55 motion is preferably relatively small—e.g., about one millimeter. Also, the cycle rate of cam 50 is preferably relatively low—e.g., one revolution per second. Another factor is the excitation frequency of the linear variable displacement transformer. With an excitation frequency of 10,000 cycles per second, it is possible to average out the effect of the disturbance mechanism 50 on the float position, so that changes in the output signal represent changes in the average float position. FIG. 2 illustrates graphically the general relationship between the two types of oscillations produced by springs 60 and the transformer. The rapid electrical oscillation of the current flow through winding 21 is indicated at 39, and the much slower cyclic motion of rod member 15 resulting from the action of springs 60 is indicated at 41. An equilibrium position of member 15 is indicated at 43. The intersection points of the curves 39 and 41 are a measure of the voltage signals generated by secondary windings 23 and 25—i.e., the deviation from true equilibrium. By sampling the amplified output by means of sample circuit 29, it is possible to obtain a large number of voltage signals, which may be averaged to obtain a true indication of the equilibrium position of float 11.

FIG. 4 shows another form of disturbance mechanism which may be utilized in accordance with the invention. This disturbance mechanism comprises two sets of rotary cams 35 and 37 having geared connections with an electric motor 38. As the respective cams rotate in the respective directions indicated by the respective arrows, the cams intermittently contact the surface of rod member 15 to exert axial forces thereon. Cams 35 exert momentary downward forces on the rod member, and cams 37 exert momentary upward forces on the rod member. The two sets of cams are one hundred eighty degrees out of phase.

The actions of cams 35 and 37 produce very slight vertical movements of rod member 15, typically one or two millimeters. The time duration of the rod member disturbance motion is preferably quite short. If each cam has a rotation rate of one-half revolution per second, then rod member 15 will be subjected to a disturbance force once every second, one downward disturbance by cams 35 and one upward disturbance by cams 37. The cams may be configured so that the contact period with rod member 15 is relatively slight, for example, less than one-tenth of the cycle time.

The purpose of the FIG. 4 disturbance mechanism is to impart a jostling force to motion member 15 without interfering with the ability of member 15 to seek a true equilibrium position. By having each cam 35 or 37 contact member 15 for only a short portion of its rotary cycle, the cam imparts the necessary jostling force without unduly controlling or restraining member 15.

The rotational motion of each of cams 35 and 37 is preferably slow in comparison to the excitation rate for the primary winding 21 of the linear variable displacement transformer. The excitation cycle rate for winding 21 will be upwards of one thousand cycles per second, whereas the oscillation or cycle motion rate of member 15 will be on the order of one or two oscillations per second.

A relatively slow oscillation of member 15 is selected chiefly because member 15 is then being controlled by mechanism 33 only for a small percentage of the time, such as less than ten per cent of each cycle. During the major portion of each oscillation cycle, member 15 is in a free-floating condition out of direct contact with mechanism 33.

Figure 3:
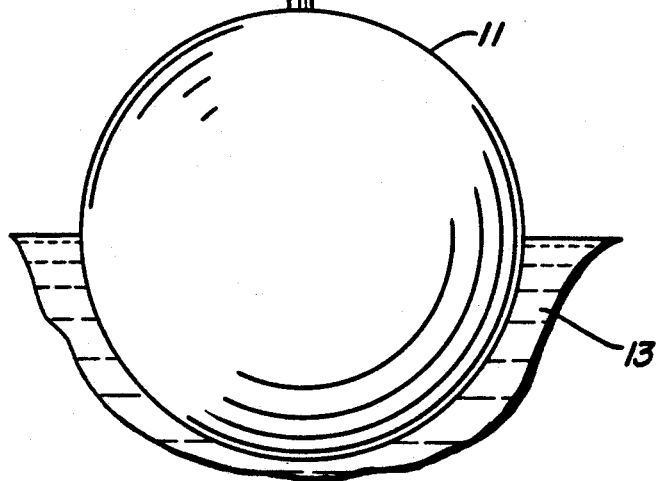
FIG. 3 is a fragmentary view illustrating an alternate disturbance mechanism which may be utilized in the FIG. 1 system.

FIGS. 1 and 4 illustrate arrangements wherein the motion-transmitting rod member 15 is oscillated axially by either of disturbance mechanisms 33 or 33a. The disturbance mechanism may be oriented to exert a disturbance force on member 15 in a radial or transverse direction. FIG. 3 shows a disturbance mechanism comprising two acoustic generators 45 mounted on a platform 47 to exert transverse forces against motion rod member 15. Each acoustic generator may include a piezoelectric crystal connected to an electrical voltage source to move a plunger 49 toward or away from the surface of rod member 15. When the piezoelectric crystals are in the quiescent non-excited state, plungers 49 will be spaced slightly away from the rod member surface.

The acoustic generators are excited cyclically, but intermittently, for example, on for 100 milliseconds, off for the next 900 milliseconds, and so on. During the major portion of each cycle rod member 15 will be in a free-floating condition out of contact with the acoustic generators.

Another jostling mechanism for use in accordance with the invention involves acoustical jostling to effectively vary the air pressure above or below a sensor member on motion member 15. Such air pressure changes may be used to free the float from hysteresis frictional effects in essentially the same manner as the mechanical jostling mechanisms shown in the drawings.

The liquid float may be used in a gas-liquid environment, as shown in FIGS. 1 and 4. The float may also be used in a two-liquid environment—e.g., water and gasoline, to detect small changes in the liquid-to-liquid interface. The system is especially useful in detecting small fluid level changes associated with leakage of a liquid into or out of a liquid container.

Thus there has been shown and described a novel liquid level detector which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventor claims:

1. A detector mechanism comprising:
   a detector element subject to being frictionally stressed from an equilibrium position,
   a motion member connected with said detector element,
   cyclically excitable means for sensing the position of said motion member at closely spaced time intervals, and
   means for cyclically disturbing said motion member to cancel the effect of frictional stress on the detector element,
   said sensing means having a cycle rate several times the cycle rate of said disturbing means, whereby the effect of the disturbing means on the detector element position is substantially eliminated as a factor in the sensing means output.

2. The detector mechanism of claim 1, wherein:
   said sensing means comprises a linear variable displacement transformer having primary and secondary windings, and an armature core movable within said windings, said core being connected with said motion member, whereby the core position within the transformer is representative of the detector element position.

3. The detector mechanism of claim 2, and further comprising:
   a sampling circuit connected with the secondary windings of the transformer, and
   an averaging circuit connected with the sampling circuit, whereby the equilibrium position of the detector element is established by averaging a substantial multiplicity of output signals generated by the secondary windings of the transformer.

4. The detector mechanism of claim 2, wherein:
   current flow through the transformer primary has a cycle rate at least one thousand times the cyclic disturbance rate for said cyclic disturbing means.

5. The detector mechanism of claim 1, wherein:
   said disturbing means is engaged with said motion member for a minor portion of the disturbance cycle time, whereby said detector element is free-floating for a major portion of each disturbance cycle.

6. A liquid level detector comprising:
   a float positionable on a liquid surface,
   a float-responsive motion member connected with said float, a cyclically excitable electric means for sensing the position of said motion member at closely spaced time intervals, and
   means for cyclically disturbing said motion member, whereby the float has a variable position on the liquid surface, and wherein
   said sensing means has a cycle rate several times the cycle rate of said disturbing means, whereby the effect of the disturbing means on the float position is substantially eliminated as a factor in the sensing means output.

7. The detector of claim 6, wherein:
   said electric means has a cycle rate at least one thousand times the cyclic disturbance rate for said disturbing means.

8. The detector of claim 7, wherein:
   said cyclic disturbing means has intermittent contact with said motion member, whereby the float is free-floating on the liquid surface most of the time and is under the control of the cyclic disturbing means for the remainder of the time.

9. The detector of claim 6, and further comprising:
   a sampling circuit connected with said electric sensing means, and
   an averaging circuit connected with the sampling circuit, whereby the equilibrium position of the float is established by averaging a substantial multiplicity of output signals generated by the sensing means.

10. A liquid level detector comprising:
    a float positionable on a liquid surface,
    a float-responsive motion member connected with said float,
    a linear variable displacement transformer comprising primary and secondary windings, and an armature core movable within said windings, said core being connected to said motion member, whereby the core position within the transformer is representative of the float position,
    means for cyclically disturbing said motion member, whereby the float has a variable position on the liquid surface, and wherein
    the current flow through the transformer primary winding has a cycle rate several times the cycle rate of said disturbing means, whereby the effect of the disturbing means on the float position is substantially eliminated as a factor in the overall output of the transformer.

11. The detector of claim 10, wherein:
    the cyclic excitation rate for the transformer primary winding is at least one thousand times the cycle rate of said disturbing means.

12. The detector of claim 10, wherein:
    said cyclic disturbing means has intermittent contact with said motion member, whereby the float is at times free-floating on the liquid surface and is at other times controlled by the cyclic disturbing means.

13. The detector of claim 10, wherein:
    said motion member is a vertical rod so arranged that the lower end of the rod is connected to the float and the upper end of the rod is connected to said core.

14. The detector of claim 10, and further comprising:
    a sampling circuit connected with the secondary windings of the transformer, and
    an averaging circuit connected with the sampling circuit, whereby the equilibrium position of the float is established by averaging a substantial multiplicity of output signals generated by the transformer secondary windings.

15. The detector of claim 10, wherein:
    the cyclic disturbing means comprises spring means.

* * * * *